3,803,213
EPHENAMINE D-(—)-2-ACETYLAMINO-2-(4-ACETOXYPHENYL)ACETATE
Abraham Weber, Paris, and Daniel Bouzard, Franconville, France, assignors to Bristol-Myers Company, New York, N.Y.
No Drawing. Filed Sept. 15, 1972, Ser. No. 289,408
Int. Cl. C07c 101/12
U.S. Cl. 260—479 R      2 Claims

ABSTRACT OF THE DISCLOSURE

Racemic 2-(p-hydroxyphenyl)glycine is efficiently resolved by O,N-di acetylation followed by the addition of about one mole of levo-erythroephenamine in hot ethanol, acetone or isopropyl alcohol to precipitate on cooling the substantially pure, crystalline levo-erythro-ephenamine salt of D-(—)-N-acetyl-2-(p-acetoxyphenyl)-glycine from which the amine is removed by extraction into methylene chloride at pH 10 followed by removal of the two acetyl groups by hot acid hydrolysis to produce the desired D-(—)-2-(p-hydroxyphenyl)glycine.

BACKGROUND OF THE INVENTION

Field of the invention

This invention relates to the use of a particular, optically active amine to resolve a racemic amino acid which is later used as the side-chain in semi-synthetic penicillins and cephalosporins.

DESCRIPTION OF THE PRIOR ART 1,2-diphenyl-2-methylaminoethanol, commonly called ephenamine (per Federal Register, June 7, 1951), has the structure

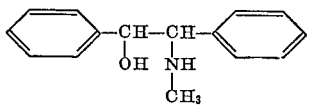

The compound is also named N-methyl-1,2-diphenyl-2-hydroxy-ethylamine or alpha, beta-diphenyl-beta-hydroxy-N-methyl-ethylamine or 1,2-diphenyl-2-methylamino-1-ethanol.

This invention utilizes only the levo-erythro-isomer. Methods for its preparation and reaction with penicillin G were described in U.S. Pats. 2,645,638 (V. V. Young) and 2,768,081 (F. H. Buckwalter). The latter reviews earlier literature as does W. B. Wheatley et al., J. Org. Chem.,18(11), 1564–1571 (1953). It was used to resolve racemic phenoxymethyl penicillin by Sheehan et al., J. Am. Chem. Soc., 81, 3089–3094 (1959); see especially p. 3091.

2-(p-hyroxyphenyl)glycine, which can also be named 2 - (4-hydroxyphenyl)glycine, α-amino-p-hydroxyphenyl-acetic acid or C-(p-hydroxyphenyl)glycine, has been prepared in racemic form by numerous workers; cf. F. F. Blicke, Org. Reactions, 1, 303–343 (1942) and B. Reichert, "Die Mannich Reaction," 1959 and Aloy et al., Chem. Abst., 5, 3557 (1911) and 4, 2447 (1910).

Its D(—) or levo-rotatory isomer has been of particular interest for coupling (after appropriate protection of the free amino group) with 6-amino-penicillanic acid (6-APA) to produce a penicillin as in U.S. 3,674,776 and U.K. 1,241,844 [ and see A. A. W. Long et al. J. Chem. Soc., © 1971, pp. 1920–1922] wherein the racemic N-benzyloxycarbonyl derivative was resolved with quinine and isolated as the ephedrine salt and for coupling with 7-aminocephalosporanic acid (7-ACA) and 7-aminodesacetoxycephalosporanic (7-ADCA) to produce cephalosporin derivatives as in U.S. 3,489,752 wherein racemic 2-(p-methoxyphenyl)-N-(chloroacetyl)glycine was treated with hog kidney acylase to remove preferentially the N-chloroacetyl group to produce amphoteric L-(+)-2-(p-methoxyphenyl)glycine and leave untouched the easily separated, acidic D-(—)-2-(p-methoxyphenyl)-N-(chloroacetyl)-glycine.

In addition, D-(—)-2-(p-hydroxyphenyl)glycine has been chlorinated (as in U.S. Pat. 3,489,746) to produce D-(—)-2-(3-chloro-4-hydroxyphenyl)-glycine which was converted in similar fashion to the corresponding penicillin and cephalosporins of U.S. Pats. 3,489,746 and 3,489,751.

D-(—)-2-(p-hydroxyphenyl)glycine was obtained by hydrolysis of actinoidin and then by synthesis; see Chemical Abstracts, 62, 4105a and 4242g (1965), 64, 8524c (1966), 69, 87,436t (1968) and 71, 3630g (1969) and the original references cited therein. See also Neims et al., Biochemistry, 5(1), 203–213 (1966) [C.A., 64, 6968h (1966)]. It was studied by Suzuki et al., C.A., 70, 43,516k (1969).

Recently Sterwin's German Offenlegungsschrift 2,134,-251 [Chem. Abstracts, 76, 11,3526p (1972)] has described a convenient synthesis of racemic 2-(p-hydroxyphenyl)glycine; it contains no specific information at all on resolution other than the general statement that this racemate can be resolved by the use of bases such as cinchonine, quinine, strychinine or brucine or acids such as tartaric acid, malic acid or camphorsulfonic acid. Only the racemic acid and its O,N-diacetyl derivative are described in Beecham's Belgian 774,029 (Farmodoc 27, 122T).

Even more recently Beecham's German Offenlegungsschrift 2,147,620 (Chemical Abstracts, 77(3), 34,938s, July 31, 1972) reported the resolution with dehydroabiethylamine of N,O-diacetyl-2-(4-hydroxyphenyl)glycine.

SUMMARY OF THE INVENTION

This invention provides as a substantially chemically and optically pure, crystalline solid the compound levo-erythro-ephanamine D-(—)-2-acetylamino-2 - (4-acetoxyphenyl)acetate.

There is also provided, according to the present invention, the process for the production of levo-erythro-ephenamine D-(—)-2-acetylamino - 2-(4-acetoxyphenyl)acetate from racemic 2-acetylamino-2-(p-acetoxyphenyl)acetic acid [also called racemic N-acetyl-2-(p-acetoxyphenyl)-glycine] which comprises mixing the latter with levo-erythro-ephenamine in an amount of about one mole of the amine per mole of the amino-acid in acetone or a lower alcohol and preferably in isopropyl alcohol or ethanol or acetone preferably in about the minimum volume needed to effect solution upon warming the mixture, with sufficient application of heat to form a solution which is then cooled slowly to precipitate substantially pure, crystalline levo-erythro-ephenamine D-(—)-2-acetylamino-2-(4-acetoxy)acetate.

There is also provided, according to the present invention, the process for the production of D-2-amino-(p-hydroxyphenyl)acetic acid from levo-erythroephenamine D-(—)-2-acetylamino-2-(4-acetoxyphenyl)acetate which comprises treating the latter with a strong base, e.g. sodium hydroxide, in aqueous media and then removing the free base levo-erythro-ephenamine by solvent extraction to leave an aqueous solution of D-N-acetyl-2-(p-acetoxyphenyl)glycine which is then heated, e.g. to reflux for several hours, at low pH in a strong acid, e.g., 2 N HCl, to obtain the corresponding acid addition salt of D-2-amino-2-(p-hydroxyphenyl)acetic acid, e.g., its hydrochloride, which is then converted to the zwitterion of D-(—)-2-amino-2-(p-hydroxyphenyl)acetic acid by treatment with alkali, e.g. aqueous sodium hydroxide or ammonia.

The invention is illustrated by the following example, but it is to be understood that this example is given by way of illustration and not of limitation. All temperatures are given in degrees centigrade. DL indicates a racemic acid and D a resolved acid of the dextro series (which in fact in this case is levo-rotatory and can thus be named as the D-(—)-acid). The levo-erythro isomer of N-methyl-1,2-diphenyl-2-hydroxymethylamine is referred to below as levo-erythro-ephenamine; it has been called simply 1-ephenamine in some patents. Levo-erythro-ephenamine D-(—)-N-acetyl - (4-acetoxyphenyl)glycine is also called levo-erythro-ephenamine D-(—)-2-acetylamino-2-(4-acetoxyphenyl)acetate or levo-erythro-ephenamine D-(—)-N,O-diacetyl-p-hydroxy-2-phenylglycine.

DESCRIPTION OF THE PREFERRED EMBODIMENTS

Example 1

DL-2-acetamino-2-(4-acetoxyphenyl)acetic acid.—561 gr. of crude DL-2-(4-hydroxyphenyl)glycine were dissolved in a solution of 538 gr. of sodium hydroxide in 2200 ml. of water and the solution was cooled to +5° C. 794 ml. of acetic anhydride was added with stirring at 5 to 10° C. during 1.5 hour. The mixture was stirred 0.5 hour after the end of the addition of the acetic anhydride and acidified below +10° C. with 33% hydrochloric acid to pH 1; 1100 ml. of HCl were used. The precipitated DL-N-acetyl-(4-acetoxyphenyl)glycine was collected by filtration, washed with water and crystallized from ethanol (3.5 l.);

428 gr., M.P. 221° C.—second crop 34 gr., M.P. 216° C. Yield=55%.

An analytical sample was obtained by crystallization from ethanol (M.P. 221° C.).

*Analysis* Calculated (percent): C=57.40; H=5.22; N=5.58. Found (percent): C=57.47; H=5.22; N=5.45.

(2) Levo-erythro-ephenamine D-(—)-2-acetylamino-2-(4-acetoxyphenyl)acetate.—113 gr. of DL-2-acetamino-(4-acetoxyphenyl)acetic acid and 102 gr. of levo-erythro-ephenamine was dissolved with heating in 450 ml. of ethanol and let stand overnight at room temperature. The crystallized levo-erythro-ephenamine D-(—)-2-acetylamino-2-(4-acetoxyphenyl)acetate was collected and washed twice with ethanol to give 59.6 gr. (55.5%) which melts around 130° C. resolidified and melted at 180° C., $[\alpha]_D$ —152° (MeOH 1%).

The analytical sample was recrystallized from ethanol $[\alpha]_D$ —153° (MeOH 1%).

*Analysis.*—Calculated (percent): C=67.75; H=6.31; N=5.85. Found (percent): C=67.45; H=6.39; N=5.75.

(3) D-(—)-2-(4-hydroxyphenyl)glycine.—The above levo-erythro-ephenamine D-(—)-2 - acetylamino-2-(4-acetoxyphenyl)acetate was suspended in 300 ml. of methylene chloride, and stirred with a solution of 6 gr. of sodium hydroxide in 70 ml. of water until all solid material disappeared. The layers were separated and the aqueous layer was washed twice with 50 ml. of methylene chloride. 25 ml. of concentrated hydrochloric acid were added to the aqueous layer and the mixture was refluxed for 1.5 hours, cooled, adjusted to pH 5 with ammonia (preferably at 40–50° C.) and let stand overnight. 11.5 gr. of D-(—)-2-(4-hydroxyphenyl)glycine, crystallized out; $[\alpha]_D$ —104.4° (H$_2$O 1%).

Water recrystallized material had $[\alpha]_D$ —108°.

Example 2

Levo-ethythro-ephenamine D-(—)-2-acetylamino-2-(4-acetoxyphenyl)acetate.—Step 1: Slurry 3.86 g. (0.0154 mole) of DL-N-acetyl-(4-acetoxyphenyl)glycine in 235 ml. of acetone and heat to reflux when completed solution should be obtained.

Step 2: Dissolved 3.49 g. (0.0154 mole) of levo-erythro-ephenamine in 25 ml. of acetone heated to 50–55° C.

Step 3: Add the hot solution from step 2 to the refluxing solution from step 1. A clear solution results.

Step 4: Cool the solution from step 3 slowly with stirring, adding seed crystals at 50°, 45° and 40°. Hold about 2 hrs. cooling slowly to 20° C. during this time. Hold about 0.5 hr. at 20–25° C.

Step 5: Collect by filtration the fine white crystals of levo-erythro-ephenamine D - (—)-2-2-acetylamino-2-(4-acetoxyphenyl)acetate and wash the cake with 30 ml. of acetone. Dry in a circulation air oven at 40° C. to obtain 3.15 g. (85.6%) of levo-erythro-ephenamine D-(—)-2-acetylamino-2-(4-acetoxyphenyl)acetate as fine white crystals with M.P. 172–173° C. and $[\alpha]_D$ —152.2° (1% MeOH).

Notes: In step 1 a few ml. of H$_2$O may be added for complete solution, but this may lower the yield. If input materials are of poor quality, a hot carbon treatment may be added at step 3.

Example 3

(A) Acetylation of dl-p-hydroxyphenylglycine.—(1) In suitable equipment set for agitation and cooling, dissolve 191 g. of sodium hydroxide pellets in 780 ml. of water. Cool to ~10° and add 200 g. of dl-p-hydroxyphenylglycine. Stir until complete solution is obtained. The solution may be very dark.

(2) Cool to 0–10° and add in portions 285 ml. of acetic anhydride over 40–48 min. In the lab ice was added occasionally to maintain the temperature below 10°. The pH drops during the addition of acetic anhydride. When the addition is complete, readjust back to pH 9–10 with 30% NaOH and hold at 0–10° for 1.5–2 hours.

(3) With good cooling lower the pH to 1.2–1.6 with concentrated hydrochloric acid. This will require about 450 ml. DL-N-acetyl-(4-acetoxyphenyl)glycine will begin to precipitate at about pH 3.

(4) Hold 1–1.5 hours at 0.5° with moderate agitation. Filter and wash the cake with about 1000 ml. of 0.5° water. Dry in a circulation air oven at 40–50° to obtain a tan, sandy solid melting in the range of 203–209°. The yield is 180–210 g., 60–70%.

(5) This crude DL-N-acetyl-(4-acetoxyphenyl)glycine is suitable for the resolution step, or it may be recrystallized by dissolving 100 g. of crude in 1000 ml. of water and 500 ml. IPA, heating to 70–75°, carbon treating with 10 g. carbon, washing the carbon cake with 100 ml. hot 2:1 H$_2$O:IPA and cooling slowly to 0–5° for 2–4 hours. The recovery is 76% of white crystalline material melting at 215–218°.

Note: An alternate procedure at step 2 is to maintain the pH at about 9.5–10.5 during the acetic anhydride addition by simultaneous addition of 30% NaOH. Also increasing the amount of acetic anhydride to 340 ml., i.e. about 50% excess, may improve the yield.

(B) Resolution.—(1) Combine 100 g. of crude DL-N-acetyl-(4-acetoxyphenyl)glycine, 90 g. of levo-erythro-ephenamine and 500 ml. of isopropyl alcohol (IPA) and 10 ml. of water. Heat to the reflux temperature when complete solution should be obtained. Add 5.0 g. of carbon and hold near reflux temperature (70–80°) for 5 to 15 minutes.

(2) While hot, filter through diatomaceous earth ("Dicalite") and wash the cake with 200 ml. of hot IPA. A medium amber solution should result.

(3) Cool slowly adding a liberal amount of seed crystals of levo-erythro-ephenamine D-(—)-2-acetylamino-2-(4-acetoxyphenyl)acetate at 60°, 55° and 50°. Hold 1 hour at 45–55° and then cool slowly over 1–1.5 hours to 35–40°. Levo-erythro-ephenamine D-(—)-2-acetylamino-2-(4-acetoxyphenyl)acetate precipitates.

(4) Filter and wash the cake with 150–200 ml. of IPA at ~25°. Save the mother liquors for possible racemization and/or recovery of levo-erythro-ephenamine. Dry the cake in a circulating air oven at 40–50°. There is obtained 54 to 74 g. (56 to 77% of available isomer) of levo-erythro-ephenamine D-(—)-2-acetylamino-2-(4-acetoxyphenyl)acetate having a rotation $[\alpha]_D$ of —152° to —140° (1% in MeOH).

(5) Depending on the yield and rotation the salt is recrystallized or hydrolyzed to D(—)p-hydroxyphenylglycine.

EXAMPLE 4

The procedure of the last step of Example 1 was improved as follows. The 6 g. of sodium hydroxide was dissolved in 150 ml. of water and later the amount of concentrated hydrochloric acid was increased to 30 ml. After the 1.5 hour period of refluxing, 130 ml. of water were distilled off at atmospheric pressure and the mixture adjusted to pH 5 at 40–50° C. with concentrated (400 g./l.) sodium hydroxide. The yield of D-(—)-2-(4-hydroxymethyl)glycine was 80% (15.9 g.).

We claim:
1. Levo-erythro-ephenamine D - (—)-2-acetylamine-2-(4-acetoxyphenyl)acetate.
2. The compound of claim 1 as a substantially pure, crystalline solid.

References Cited

Rubin: Chem. Abstracts, vol. 53 (1959), 22,760f.

JAMES A, PATTEN, Primary Examiner

U.S. Cl. X.R.

260—519